(12) United States Patent
Sakuma et al.

(10) Patent No.: US 11,035,275 B2
(45) Date of Patent: Jun. 15, 2021

(54) HEATER CONTROL DEVICE AND HEATER CONTROL METHOD

(71) Applicant: Bosch Corporation, Tokyo (JP)

(72) Inventors: Keisuke Sakuma, Kanagawa (JP); Keijiro Ozaki, Kanagawa (JP); Eiichi Kitazawa, Kanagawa (JP); Masahiro Yamaguchi, Kanagawa (JP)

(73) Assignee: Bosch Corporation, Tokyo (JP)

( * ) Notice: Subject to any disclaimer, the term of this patent is extended or adjusted under 35 U.S.C. 154(b) by 5 days.

(21) Appl. No.: 16/469,230

(22) PCT Filed: Nov. 7, 2017

(86) PCT No.: PCT/JP2017/040010
§ 371 (c)(1),
(2) Date: Jun. 13, 2019

(87) PCT Pub. No.: WO2018/110143
PCT Pub. Date: Jun. 21, 2018

(65) Prior Publication Data
US 2020/0102869 A1    Apr. 2, 2020

(30) Foreign Application Priority Data
Dec. 13, 2016 (JP) .............................. JP2016-241557

(51) Int. Cl.
*F01N 3/00*    (2006.01)
*F01N 3/20*    (2006.01)
*F01N 3/24*    (2006.01)

(52) U.S. Cl.
CPC ............... *F01N 3/206* (2013.01); *F01N 3/24* (2013.01)

(58) Field of Classification Search
CPC ........ F01N 3/206; F01N 3/24; F01N 2240/16; F01N 2900/1811; F01N 3/2066; F01N 2610/105; F01N 3/08; F01N 2610/10
See application file for complete search history.

(56) References Cited

U.S. PATENT DOCUMENTS 10,202,886 B1 *   2/2019   Teslovich .................. F01P 3/02
2010/0064668 A1 * 3/2010   Beckmann .............. F01N 3/208
                                                           60/286
(Continued)

FOREIGN PATENT DOCUMENTS

JP    2005214403    8/2005
JP    2009293619    12/2009
(Continued)

OTHER PUBLICATIONS

International Search Report for Application No. PCT/JP2017/040010 dated Jan. 9, 2018 (English Translation, 1 pages).

*Primary Examiner* — Matthew T Largi
(74) *Attorney, Agent, or Firm* — Michael Best & Friedrich LLP

(57) ABSTRACT

The present invention provides a heater control device and a heater control method capable of suppressing a maximum value of a current flowing through a current supply circuit to a heater in a reducing agent supplier. The heater control device is a heater control device including: a tank heater for heating a reducing agent stored in a tank; and a piping heater for heating the reducing agent in a flow channel including a supply channel, and includes: a first current supply circuit that supplies a current to the tank heater; a second current supply circuit that supplies a current to the piping heater; a common current supply circuit that connects between a battery and each of the first current supply circuit and the second current supply circuit; and a heater control unit that controls driving of the tank heater and the piping heater. The (Continued)

heater control unit controls driving of the tank heater and the piping heater on the basis of a total value of the current supplied to the tank heater and the current supplied to the piping heater and a rated current value of the common current supply circuit.

30 Claims, 9 Drawing Sheets

(56) References Cited

U.S. PATENT DOCUMENTS

| | | | | |
|---|---|---|---|---|
| 2010/0175469 | A1* | 7/2010 | Ni | F16L 53/38 |
| | | | | 73/204.27 |
| 2010/0186374 | A1* | 7/2010 | Peucat | B60K 13/04 |
| | | | | 60/274 |
| 2011/0240630 | A1* | 10/2011 | Etorre | H05B 3/82 |
| | | | | 219/482 |
| 2012/0008927 | A1* | 1/2012 | Borgmeier | H05B 3/46 |
| | | | | 392/478 |
| 2014/0166636 | A1* | 6/2014 | Naydenov | F01N 9/00 |
| | | | | 219/441 |
| 2014/0208719 | A1* | 7/2014 | Naydenov | F01N 3/2066 |
| | | | | 60/274 |

FOREIGN PATENT DOCUMENTS

| | | |
|---|---|---|
| JP | 2010105676 | 5/2010 |
| WO | 2014024307 | 2/2014 |

* cited by examiner

[FIG. 1]
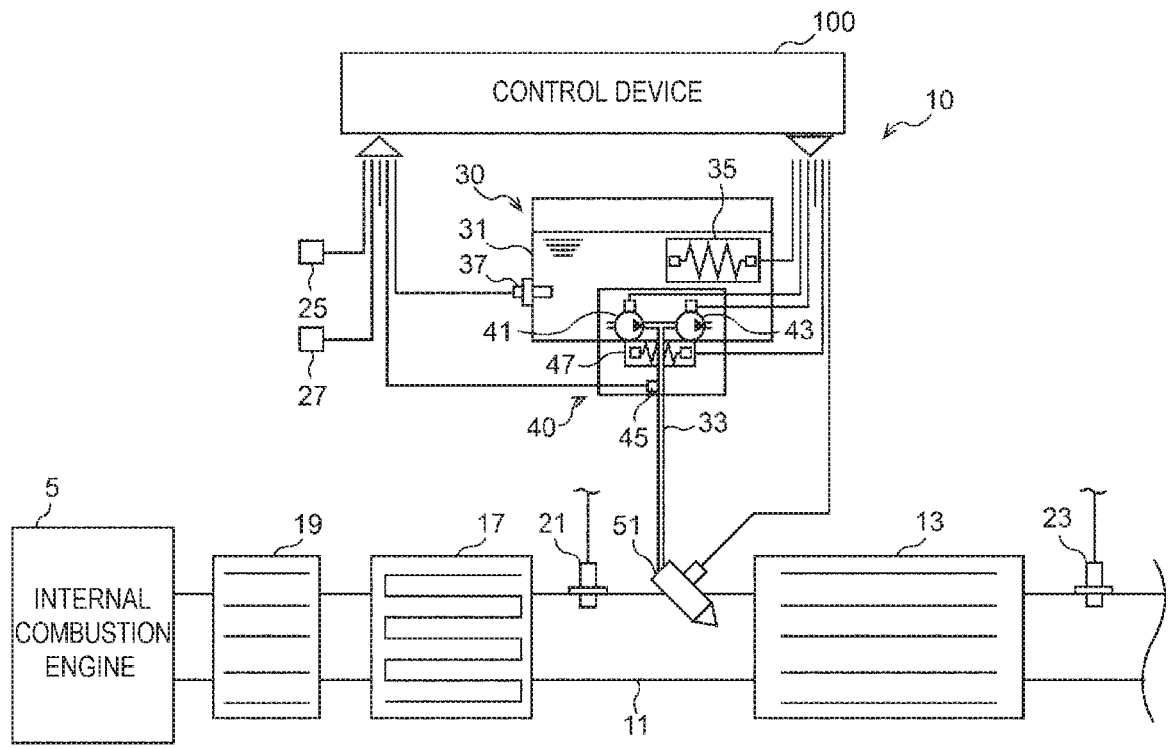
[FIG. 2]
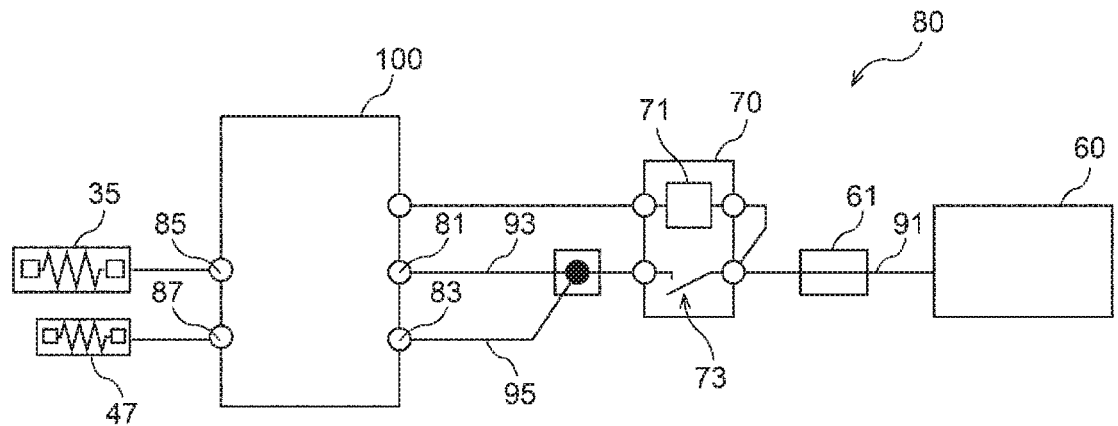

[FIG. 3]
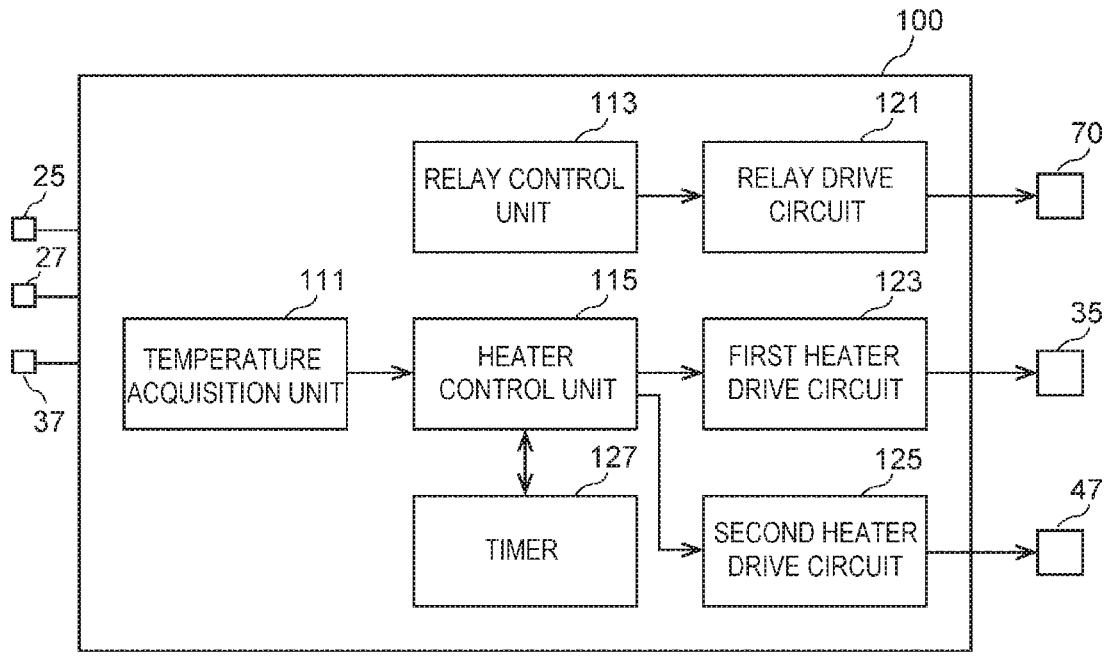
[FIG. 4]
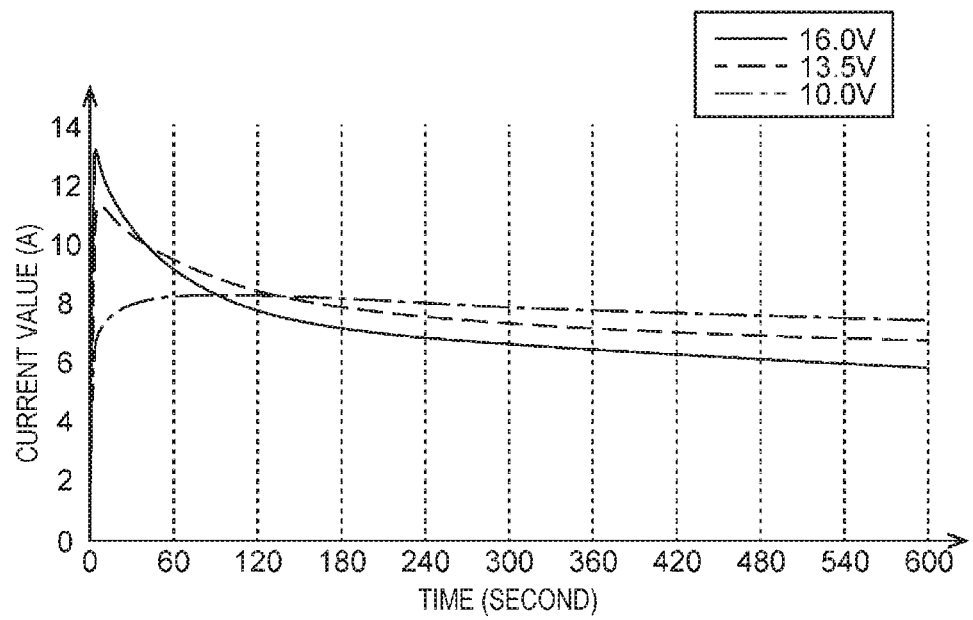

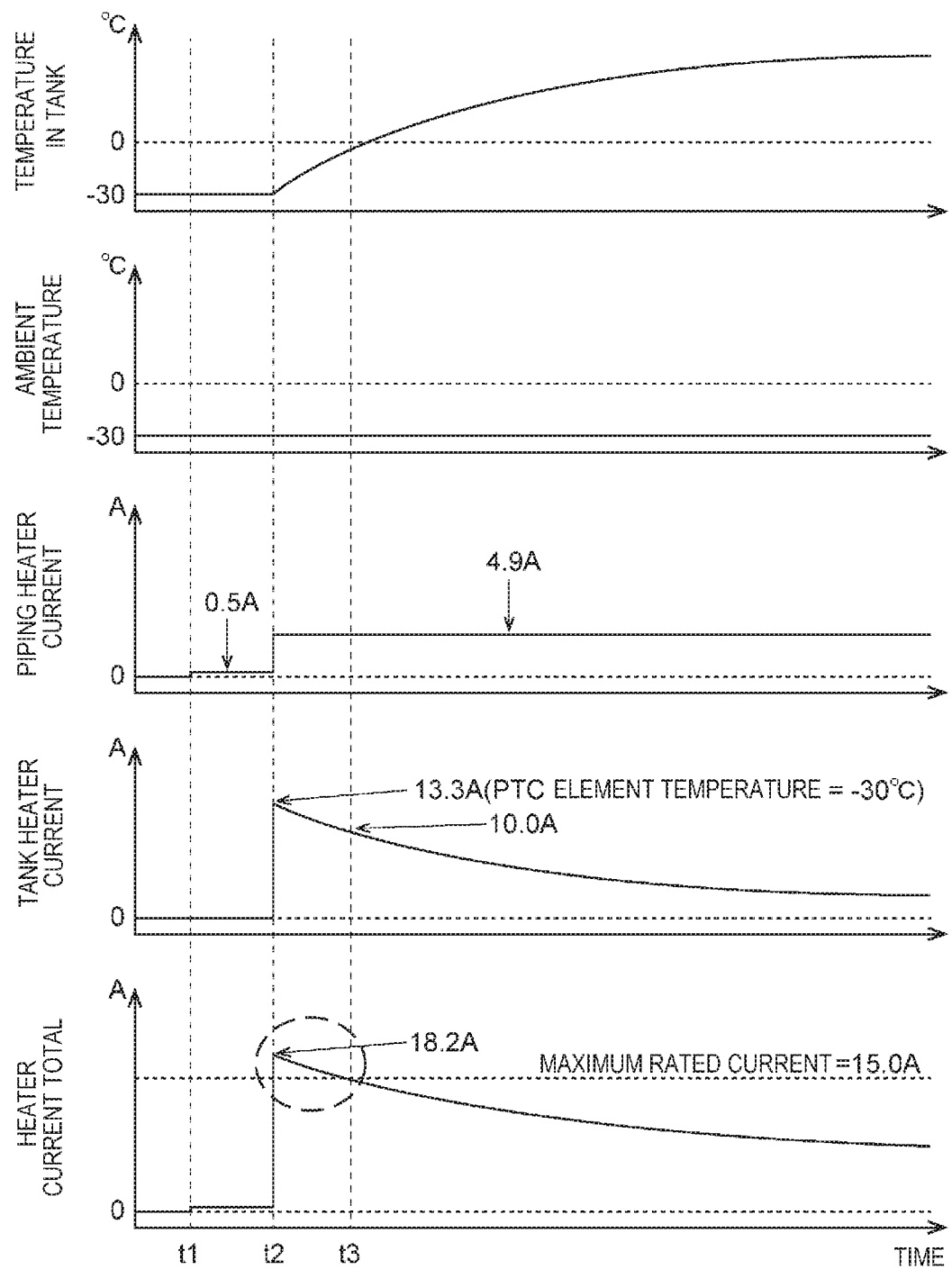
[FIG. 5]

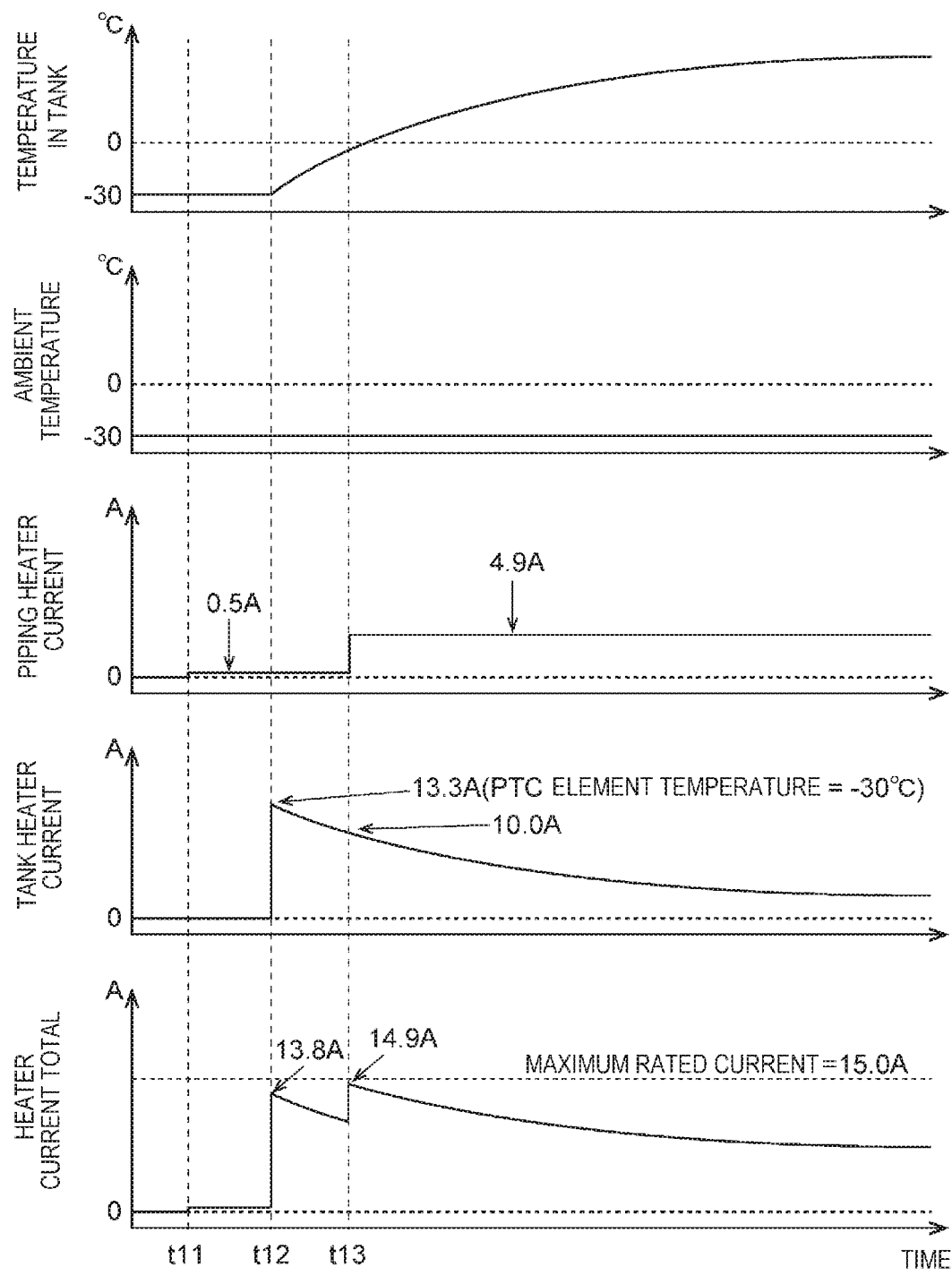
[FIG. 6]

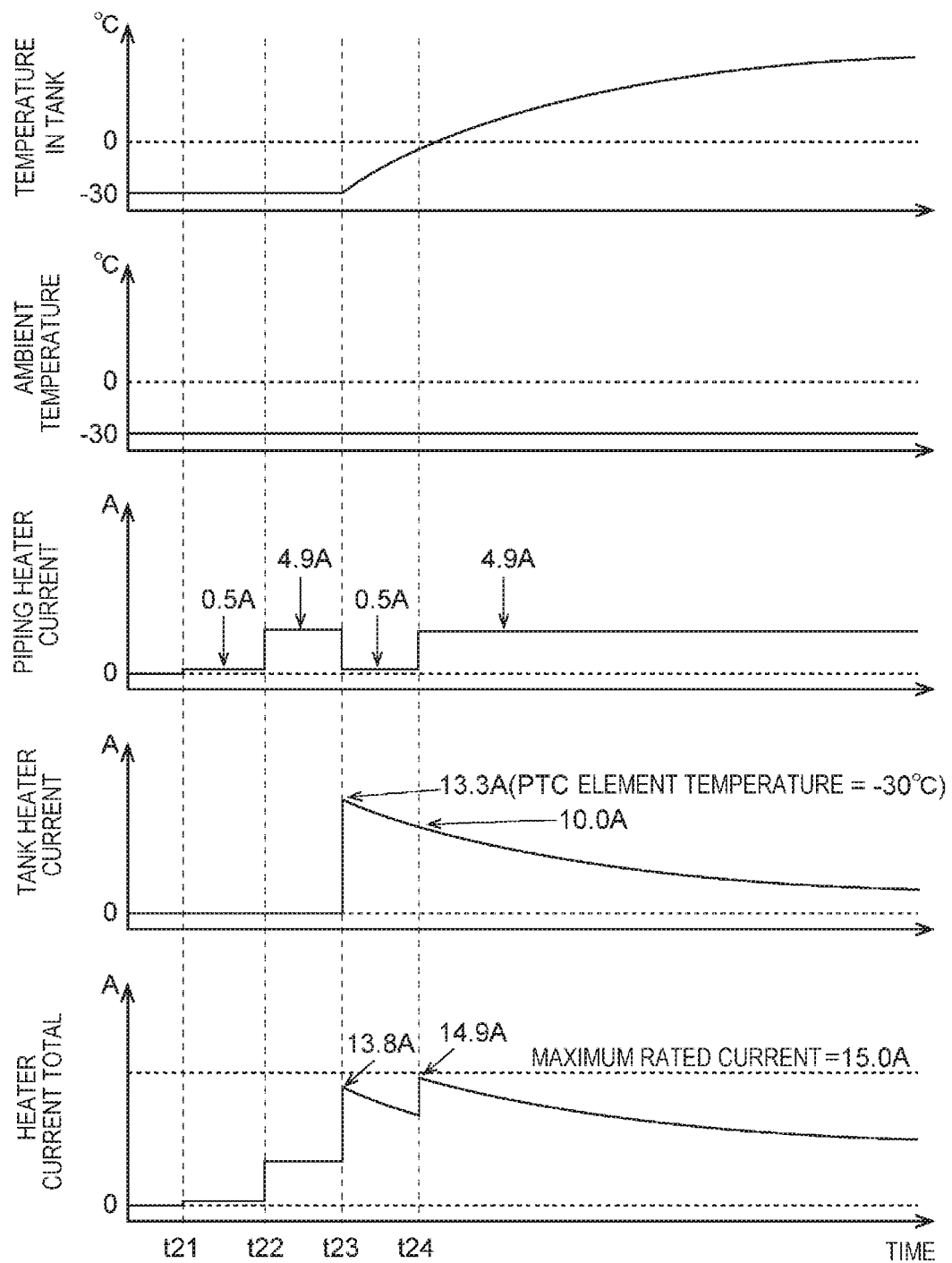

[FIG. 8]
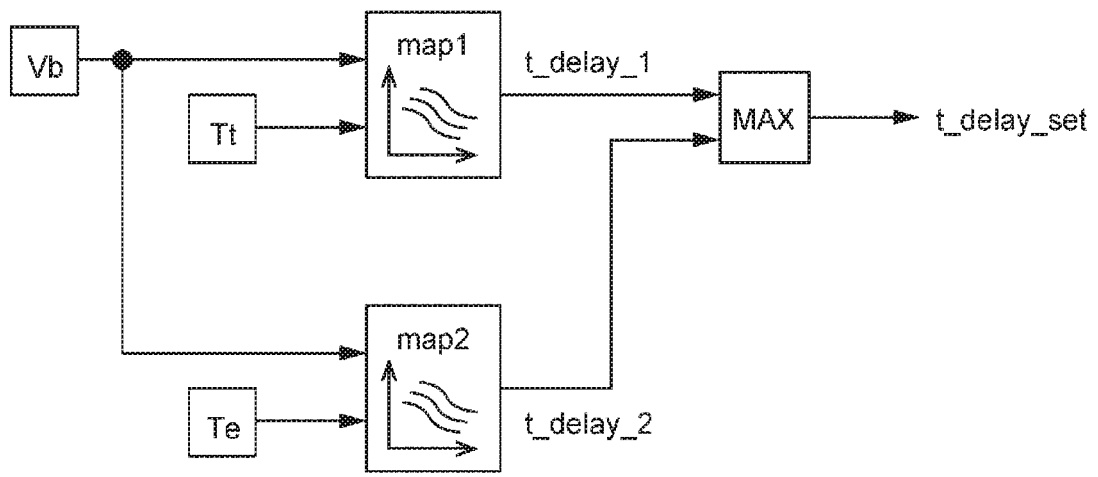

[FIG. 9]
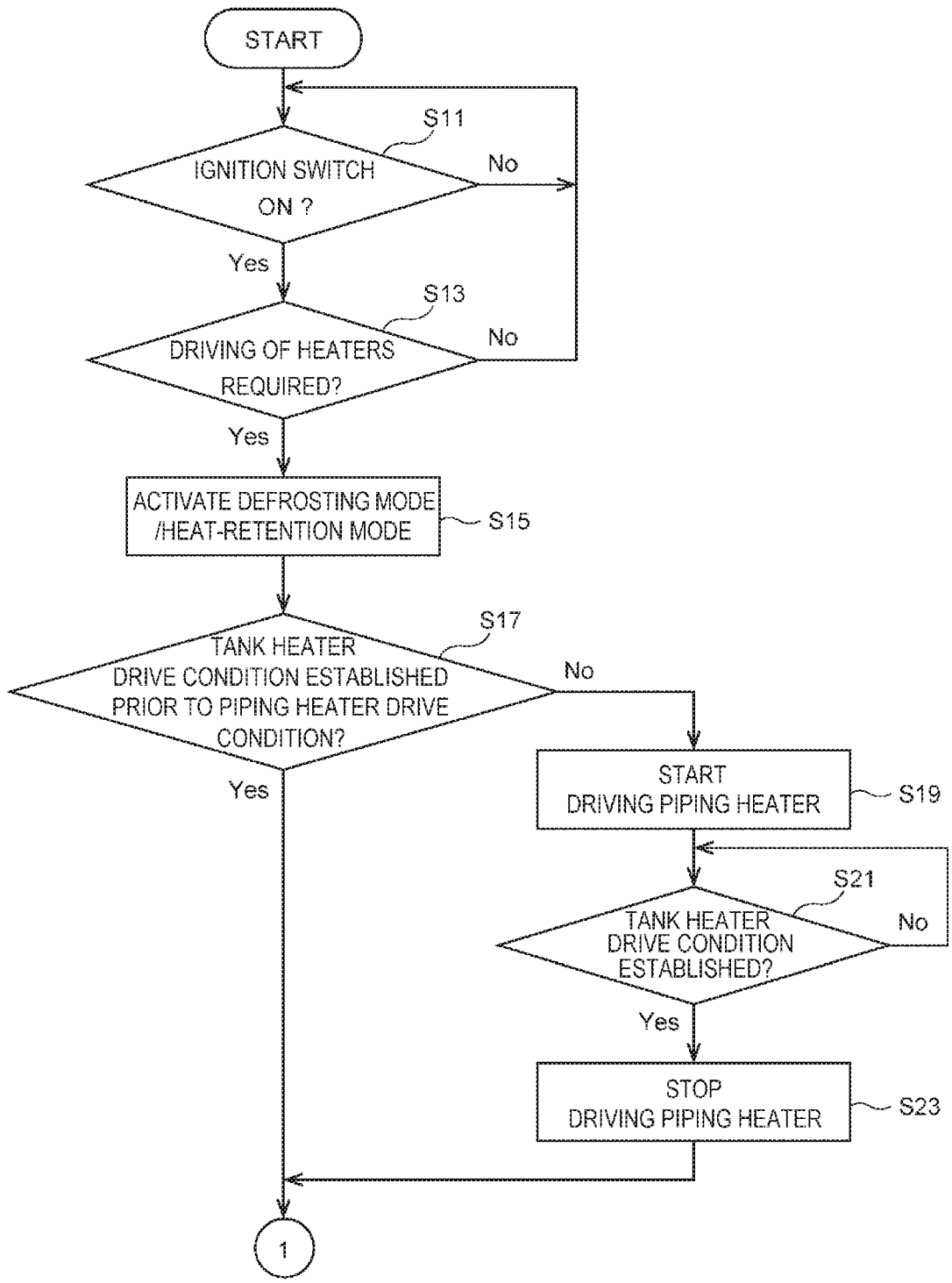

[FIG. 10]
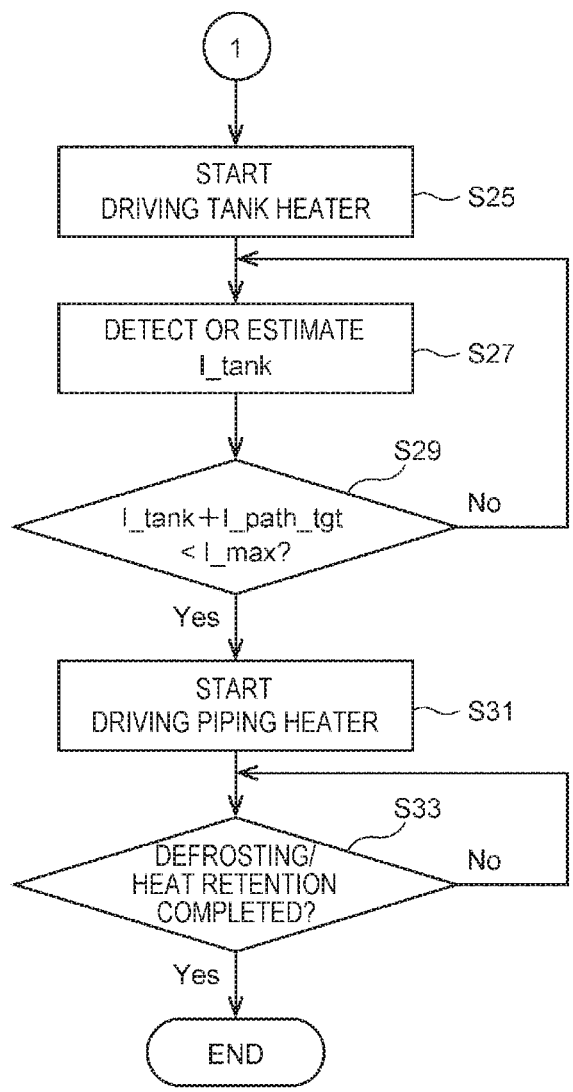

[FIG. 11]
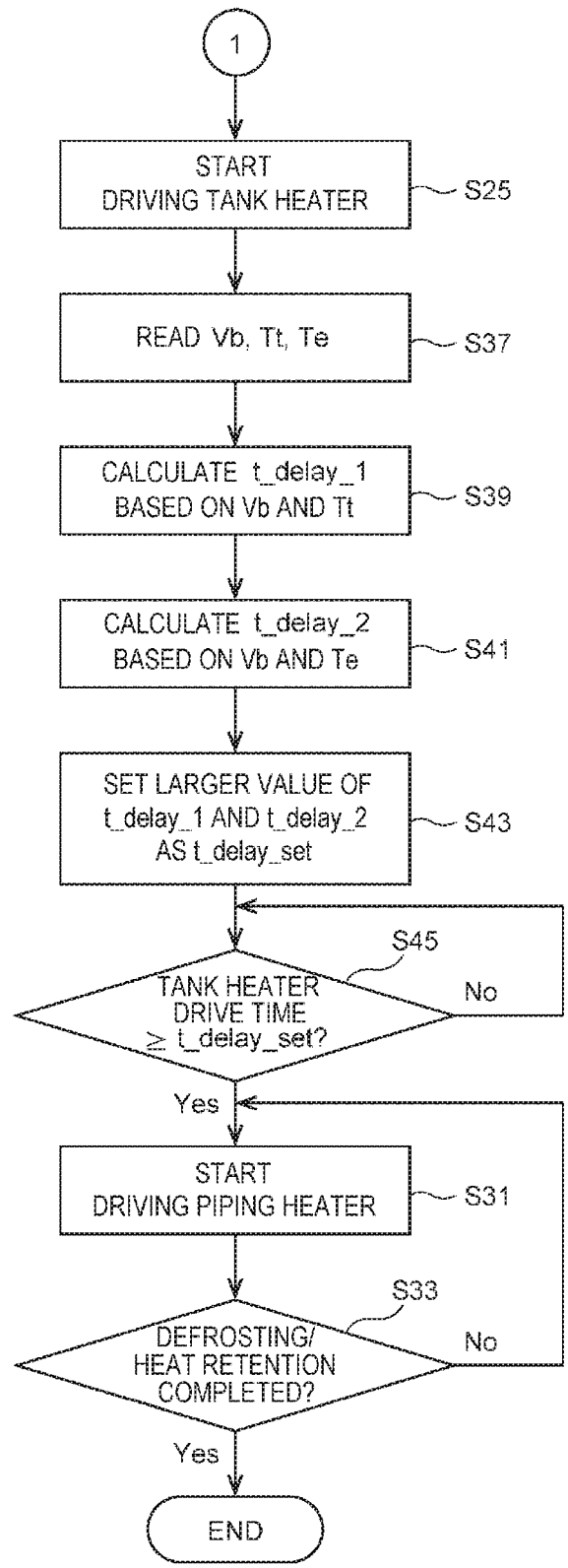

HEATER CONTROL DEVICE AND HEATER CONTROL METHOD

BACKGROUND OF THE INVENTION

The present invention relates to a heater control device provided in a reducing agent supplier and to a heater control method.

There is a case where $NO_X$ (nitrogen oxides) are contained in exhaust gas of an internal combustion engine such as a diesel engine mounted on a vehicle. As a device that reduces such $NO_X$ by decomposing $NO_X$ into nitrogen, water, and the like so as to purify the exhaust gas, a urea selective catalytic reduction (SCR) system has been in practical use. The urea SCR system is a system that uses a urea aqueous solution as a reducing agent for causing $NO_X$ in the exhaust gas to react with ammonia, so as to decompose $NO_X$.

Such a urea SCR system includes: a selective reduction catalyst disposed in the middle of an exhaust passage; and a reducing agent supplier for supplying the urea aqueous solution to a portion of the exhaust passage on an upstream side of the selective reduction catalyst. The selective reduction catalyst has a function of adsorbing ammonia that is produced when the urea aqueous solution undergoes hydrolysis, and promoting a reduction reaction of $NO_X$ in the inflow exhaust gas with ammonia. The reducing agent supplier includes: a pump that pressure-feeds the urea aqueous solution stored in a tank; an injection valve that injects the urea aqueous solution pressure-fed by the pump; and a control device that controls the pump and the injection valve.

A freezing point of the urea aqueous solution used in the urea SCR system differs by concentration thereof. The lowest freezing point is approximately 11° C. below zero. In order to prevent freezing of the urea aqueous solution and sequential expansion of a volume thereof during a stop of the vehicle, which further leads to damage to the pump, the injection valve, piping through which the urea aqueous solution flows, or the like, such control is executed during a stop of the internal combustion engine that the urea aqueous solution remaining in a flow channel or the injection valve is collected in the tank. The collected urea aqueous solution is provided into the reducing agent supplier at activation of the reducing agent supplier.

Meanwhile, in the case where the urea aqueous solution in the tank or the urea aqueous solution remaining in the piping or the like is frozen at the activation of the reducing agent supplier, the urea aqueous solution cannot be supplied to the exhaust passage despite a fact that the exhaust gas is produced after the start of the internal combustion engine. To handle such a problem, the reducing agent supplier includes a heater for defrosting the urea aqueous solution that is frozen under low-temperature environment. For example, in JP-A-2009-293619, a SCR measuring supply system that includes: a sample heater provided in the tank; and a supply heater provided in the piping for the urea aqueous solution is disclosed. Such heaters are operated when an internal temperature of the tank or an ambient temperature falls below a specified temperature.

SUMMARY OF THE INVENTION

Here, because thermal capacity of the tank that stores the urea aqueous solution is relatively large, the heater provided in the tank is required to have an ability to heat the urea aqueous solution with a large amount of heat. For such a reason, there is a case where a positive temperature coefficient (PTC) heater including a PTC element is used as the heater provided in the tank (hereinafter also referred to as a "tank heater"), and the PTC element has such a characteristic that a resistance value thereof is increased with a temperature increase. Even in the case where a large current is supplied to the PTC heater at a start of driving and the large amount of heat is thereby generated, the resistance value of the PTC element is increased with the temperature increase, which gradually reduces a current value and further gradually reduces a heat generation amount. That is, the PTC heater can automatically suppress an excessive temperature increase without a current feedback circuit.

Meanwhile, thermal capacity of the flow channel for the urea aqueous solution is smaller than that of the tank, and the flow channel can defrost the urea aqueous solution with a small amount of heat. As a heater provided in such a flow channel (hereinafter also referred to as a "piping heater"), a heater whose heat generation amount is controlled by current control, such as an ohmic heater, is used. Because temperature dependency of a resistance value of such a heater is relatively flat and the heater does not have a function of automatically suppressing the excessive temperature increase, driving of such a heater is controlled by feedback control of the current value, for example.

In the case where the ambient temperature of the like is low at the start of the internal combustion engine, both of these tank heater and piping heater may be operated. After energization of the large-capacity PTC heater is started, the large-capacity PTC heater requires the large current until the resistance value of the PTC element is increased by the temperature increase. Thus, in the case where both of the tank heater and the piping heater are operated, the large current is temporarily required. For such a reason, a circuit that supplies the current to the tank heater and the piping heater needs to have a specification capable of handling the temporarily-generated maximum current. In this case, as a component of the current supply circuit, a special part such as a part that lacks versatility or an expensive part needs to be used.

The present invention has been made in view of the above problem and therefore provides a heater control device and a heater control method capable of suppressing a maximum value of a current flowing through a current supply circuit to a heater in a reducing agent supplier.

In order to solve the above problem, according to an aspect of the present invention, a heater control device including: a tank heater for heating a reducing agent stored in a tank; and a piping heater for heating the reducing agent in a flow channel including a supply channel is provided. The heater control device includes: a first current supply circuit that supplies a current to the tank heater; a second current supply circuit that supplies a current to the piping heater; a common current supply circuit that connects between a battery and each of the first current supply circuit and the second current supply circuit; and a heater control unit that controls driving of the tank heater and the piping heater. The heater control unit controls driving of the tank heater and the piping heater on the basis of a total value of the current supplied to the tank heater and the current supplied to the piping heater and a rated current value of the common current supply circuit.

In addition, in order to solve the above problem, according to another aspect of the present invention, a heater control method for controlling a tank heater and a piping heater is provided. The tank heater is a heater for heating a reducing agent stored in a tank, and a current is supplied thereto through a common current supply circuit and a first current supply circuit. The piping heater is a heater for heating the reducing agent in a flow channel including a supply channel, and a current is supplied thereto through the common current supply circuit and a second current supply circuit. The heater control method controls driving of the tank heater and the piping heater on the basis of a total value of the current supplied to the tank heater and the current supplied to the piping heater and a rated current value of the common current supply circuit.

According to the present invention, it is possible to suppress a maximum value of the current flowing through a current supply circuit to the heater in a reducing agent supplier.

BRIEF DESCRIPTION OF THE DRAWINGS

FIG. 1 is a schematic view of a urea SCR system.

FIG. 2 is a circuit diagram of a configuration example of a heater control device.

FIG. 3 is a block diagram of the configuration example of the heater control device.

FIG. 4 is a graph illustrating temporal changes in current values flowing through a tank heater.

FIG. 5 includes graphs illustrating a temporal change in a total value of current values of the tank heater and a piping heater.

FIG. 6 includes graphs illustrating the temporal change in the total value of the current values of the tank heater and the piping heater.

FIG. 7 includes graphs illustrating the temporal change in the total value of the current values of the tank heater and the piping heater.

FIG. 8 is an explanatory diagram illustrating an example of a method for determining piping heater drive start timing.

FIG. 9 is a flowchart of an example of a heater control method.

FIG. 10 is a flowchart of a first example of the heater control method.

FIG. 11 is a flowchart of a second example of the heater control method.

DETAILED DESCRIPTION

A detailed description will hereinafter be made on a preferred embodiment of the present invention with reference to the accompanying drawings. In the present specification and the drawings, components that have substantially the same functional configurations will be denoted by the same reference signs, and a description thereon will not be repeated.

1. Overall Configuration of Urea SCR System

Referring to FIG. 1, a description will be made on an example of an overall configuration of a urea SCR system 10 to which a heater control device according to this embodiment can be applied. FIG. 1 is a schematic view of a schematic configuration of the urea SCR system 10. The urea SCR system 10 includes a selective reduction catalyst 13 and a reducing agent supplier 30. The urea SCR system 10 is a system that is mounted on a vehicle, a construction machine, an agricultural machine, or the like, uses a urea aqueous solution as a liquefied reducing agent to reduce $NO_X$ in exhaust gas discharged from an internal combustion engine 5 represented by a diesel engine or the like, and thereby purifies the exhaust gas.

As the urea aqueous solution, a urea aqueous solution with concentration of approximately 32.5%, with which a freezing point is the lowest is used, for example. In this case, the freezing point is approximately 11° C. below zero. The urea aqueous solution has such a characteristic that the freezing point is elevated as the concentration thereof is increased from 32.5%, and crystallization thereof is promoted when moisture as a solvent is evaporated.

The selective reduction catalyst 13 is disposed in the middle of an exhaust pipe 11 that is provided in an exhaust system for the internal combustion engine 5, and uses the urea aqueous solution to selectively reduce $NO_X$ contained in the exhaust gas of the internal combustion engine 5. More specifically, the selective reduction catalyst 13 adsorbs ammonia that is produced when the urea aqueous solution, which is injected by the reducing agent supplier 30, undergoes hydrolysis, and causes $NO_X$ in the exhaust gas flowing into the selective reduction catalyst 13 to react with ammonia for the reduction. The selective reduction catalyst 13 has such a characteristic that an ammonia adsorbable amount thereof is reduced as a catalyst temperature is increased. The selective reduction catalyst 13 also has such a characteristic that $NO_X$ reduction efficiency is increased as an actual ammonia adsorption rate with respect to the adsorbable amount is increased.

The reducing agent supplier 30 injects and supplies the urea aqueous solution in a form of a mist into a portion of an exhaust passage on an upstream side of the selective reduction catalyst 13. An injection amount of the urea aqueous solution is controlled on the basis of concentration of $NO_X$ contained in the exhaust gas, the ammonia adsorbable amount of the selective reduction catalyst 13, the temperature of the selective reduction catalyst 13, and the like such that neither $NO_X$ nor ammonia flows into a downstream side of the selective reduction catalyst 13.

In a portion of the exhaust pipe 11 on an upstream side of the selective reduction catalyst 13, an upstream $NO_X$ sensor 21 that detects $NO_X$ concentration in the exhaust gas is provided. In addition, in a portion of the exhaust pipe 11 on a downstream side of the selective reduction catalyst 13, a downstream $NO_X$ sensor 23 that detects $NO_X$ concentration in the exhaust gas that has flowed through the selective reduction catalyst 13 is provided. Sensor signals of these upstream $NO_X$ sensor 21 and downstream $NO_X$ sensor 23 are output to a controller 100 and used for injection control of the urea aqueous solution. In addition to these, the exhaust pipe 11 may be provided with an exhaust temperature sensor, an ammonia sensor, and the like, which are not illustrated.

2. Reducing Agent Supplier

Next, a detailed description will be made on an example of a configuration of the reducing agent supplier 30. FIG. 1 schematically illustrates the reducing agent supplier 30. The reducing agent supplier 30 includes: an injection valve 51 that is attached to the portion of the exhaust pipe 11 on the upstream side of the selective reduction catalyst 13; and a pump unit 40 that has a supply pump 41 and a collection pump 43. The pump unit 40 and the injection valve 51 are subjected to drive control by the controller 100.

In the reducing agent supplier 30 illustrated in FIG. 1, the pump unit 40 is provided in a tank 31. Such a pump unit 40 includes the supply pump 41, the collection pump 43, a pressure sensor 45, and a piping heater 47. The tank 31 includes a tank temperature sensor 37 that detects a temperature of the urea aqueous solution stored in the tank 31. A sensor signal of the tank temperature sensor 37 is output to the controller 100. Note that the pump unit 40 may separately be provided from the tank 31.

The supply pump 41 discharges the urea aqueous solution, which is stored in the tank 31, to a reducing agent supply channel 33 so as to supply the urea aqueous solution to the injection valve 51. As the supply pump 41, a motorized diaphragm pump, a motorized gear pump, or an electromagnetic pump is used, for example. The supply pump 41 is subjected to drive control by the controller 100. The supply channel 33 is provided with the pressure sensor 45 that detects a pressure in the supply channel 33, and a sensor signal of the pressure sensor 45 is output to the controller 100. The controller 100 executes feedback control on output of the supply pump 41 on the basis of a difference between the detected pressure by the pressure sensor 45 and a specified target value such that the pressure of the urea aqueous solution to be supplied to the injection valve 51 becomes the target value.

Note that the supply pump 41 is limited to that of a type whose output is subjected to the feedback control on the basis of the supply pressure. For example, the output control may be executed such that an amount of the urea aqueous solution corresponding to the injection amount thereof from the injection valve 51 is pressure-fed. In this case, the pressure sensor 45 may not be provided.

The collection pump 43 collects the urea aqueous solution that remains in the supply channel 33 and the injection valve 51 after turning OFF of an ignition switch of the internal combustion engine 5 into the tank 31. The collection pump 43 is subjected to drive control by the controller 100. The controller 100 drives the collection pump 43 for a preset period after the turning OFF of the ignition switch, so as to collect the urea aqueous solution into the tank 31.

Note that, in order to collect the urea aqueous solution into the tank 31, a bidirectionally rotatable pump may be used instead of using the two pumps. Alternatively, in order to collect the urea aqueous solution into the tank 31, a flow passage switching valve may be used to switch a flow direction of the urea aqueous solution that is pressure-fed by the pump. The flow passage switching valve is constructed of an electromagnetic switching valve, for example, forms a flow passage such that the urea aqueous solution flows from the tank 31 side to the injection valve 51 side when the injection control of urea aqueous solution into the exhaust pipe 11 is executed, and forms a flow passage such that the urea aqueous solution flows from the injection valve 51 side to the tank 31 side when the remaining urea aqueous solution is collected into the tank 31.

As the injection valve 51, an electromagnetic injection valve that is switched between opening and closing by energization control, for example. Such an injection valve 51 includes an electromagnetic coil, and is structured to be opened when a magnetic force, which is generated by energizing the electromagnetic coil, moves a valve body. In this embodiment, since the output of the supply pump 41 is controlled such that the pressure of the urea aqueous solution to be supplied to the injection valve 51 becomes the specified target value, the controller 100 adjusts a valve opening period in accordance with a target injection amount of the urea aqueous solution. Such an injection valve 51 directly injects the urea aqueous solution into the exhaust pipe 11, and is attached to the exhaust pipe 11 such that an injection hole faces the inside of the exhaust pipe 11. In order to uniformly dispersing the urea aqueous solution, which is injected from the injection valve 51, a diffusing member such as a mixer may be provided in the exhaust pipe 11.

The injection valve 51 may be provided with cooling means that protects the injection valve 51 against exhaust heat and the like. For example, the injection valve 51 may be cooled by retaining the injection valve 51 in a cooling cover in which a coolant passage is provided and by causing a coolant for the internal combustion engine 5 to flow through the coolant passage. With such cooling means, the coolant for the internal combustion engine 5 flows through the cooling cover after the internal combustion engine 5 is started. As a result, the injection valve 51 is suppressed from being overheated. Alternatively, a radiation fin may be provided on an outer circumference of the injection valve 51 to improve heat radiation efficiency from the injection valve 51.

Here, as described above, the freezing point of the urea aqueous solution is approximately 11° C. below zero. Depending on peripheral environment of the vehicle, the urea aqueous solution possibly gets frozen at a stop of the internal combustion engine 5, or the like. In the case where the urea aqueous solution is frozen, the urea aqueous solution injection control cannot be started in a period until the urea aqueous solution is defrosted. To handle such a problem, the reducing agent supplier 30 includes a tank heater 35 and the piping heater 47 to defrost the urea aqueous solution promptly.

In the tank 31, the tank heater 35 is provided at a position where the tank heater 35 can heat the urea aqueous solution. Because thermal capacity of the tank 31, which stores the urea aqueous solution, is large, the tank heater 35 is required to have an ability to heat the urea aqueous solution in the tank 31 with a large amount of heat. In this embodiment, as the tank heater 35, a PTC heater having a PTC element is used. The PTC element has such a characteristic that a resistance value thereof is increased with a temperature increase. That is, in the case where a constant voltage is supplied to drive such a tank heater 35, the resistance value of the PTC element is increased with the temperature increase, and consequently, a current value is gradually reduced. For such a reason, a heat generation amount of the tank heater 35 is reduced with the temperature increase even when the heat generation amount is set to be large at a start of operation. Thus, the tank heater 35 can automatically suppress an excessive temperature increase thereof without a current feedback circuit.

The piping heater 47 is provided adjacent to the supply pump 41 and the collection pump 43. In this embodiment, the piping heater 47 is provided in the pump unit 40, and is provided at a position where the piping heater 47 can heat the supply pump 41 and the collection pump 43. However, an installment position of the piping heater is not limited to that in the pump unit 40. A flow channel that is heated by the piping heater may be the supply channel 33 that connects the supply pump 41 and the injection valve 51. In addition, the number of the installed piping heater 47 is not limited to one but may be plural. Note that, in the present specification, the "flow channel" provided with the piping heater also includes the pump that discharges the reducing agent.

The flow channel for the urea aqueous solution including the supply pump 41 and the collection pump 43 has smaller thermal capacity than the tank 31. Thus, the piping heater 47 can be a heater with a relatively small heat generation amount. In this embodiment, as the piping heater 47, an ohmic heater whose change in a resistance value caused by a temperature of its own is small and which can control a heat generation amount by controlling a supplied current value is used. That is, because the piping heater 47 does not have a function of suppressing an excessive temperature increase by the heater itself, the controller 100 is provided with a current value feedback circuit, and the current value supplied to the piping heater 47 is subjected to the feedback control by PID control or the like.

In the urea SCR system 10 according to this embodiment, in the case where the temperature in the tank 31 or an ambient temperature is low at a start of the internal combustion engine 5, or the like, such control is executed that the tank heater 35 or the piping heater 47 is driven to defrost the frozen urea aqueous solution. Thus, even in the case where the urea aqueous solution is frozen, the urea aqueous solution is promptly defrosted, and the injection control of the urea aqueous solution can be started early.

3. Heater Control Device

Next, a detailed description will be made on the heater control device according to this embodiment by adopting the heater control device provided in the urea SCR system 10 illustrated in FIG. 1 as an example.

3-1. Circuit Configuration

FIG. 2 illustrates a configuration example of an electric circuit in a heater control device 80 that controls a supply of electric power to the tank heater 35 and the piping heater 47. The heater control device 80 controls the supply of the electric power to the tank heater 35 and the piping heater 47 from a battery (a power supply) 60 whose rated voltage is 12 V, for example. In the heater control device 80 according to this embodiment, the electric power from the battery 60 is supplied to the tank heater 35 through a common current supply circuit 91 and a first current supply circuit 93. In addition, the piping heater 47 is supplied with the electric power from the battery 60 through the common current supply circuit 91 and a second current supply circuit 95. That is, the first current supply circuit 93, through which the electric power is supplied to the tank heater 35, and the second current supply circuit 95, through which the electric power is supplied to the piping heater 47, are each provided to be branched from the common current supply circuit 91.

The first current supply circuit 93 is connected to the controller 100 via a terminal 81. The controller 100 is provided with a first heater drive circuit for driving the tank heater 35. The tank heater 35 is subjected to drive control by the first heater drive circuit, and the electric power is supplied to the tank heater 35 via a terminal 85.

The second current supply circuit 95 is connected to the controller 100 via a terminal 83. The controller 100 is provided with a second heater drive circuit for driving the piping heater 47. The piping heater 47 is subjected to drive control by the second heater drive circuit, and the electric power is supplied to the piping heater 47 via a terminal 87. In the heater control device 80 according to this embodiment, the second current supply circuit 95 is also used to supply the electric power to a power supply circuit of the controller 100.

The common current supply circuit 91 has a fuse 61 and a main relay 70. The fuse 61 interrupts the common current supply circuit 91 when a large current that exceeds a rated current flows through the common current supply circuit 91, so as to protect the circuits for supplying the electric power to the tank heater 35 and the piping heater 47. The main relay 70 is driven by the controller 100 to open/close the common current supply circuit 91. The main relay 70 has an electromagnetic coil 71 and a switch 73 that is driven when the electromagnetic coil 71 is energized. The controller 100 controls a supply of the current to the electromagnetic coil 71. The switch 73 is attracted to the electromagnetic coil 71 side by a magnetic force, which is generated during the energization of the electromagnetic coil 71, and thereby closes the common current supply circuit 91.

In the case where neither the tank heater 35 nor the piping heater 47 is used, the main relay 70 opens the common current supply circuit 91, and thus the supply of the electric power to the tank heater 35 and the piping heater 47 is interrupted. In this way, a reduction in a state of charge of the battery 60 is suppressed. In addition, electrical leakage at the time when neither the tank heater 35 nor the piping heater 47 is used, and the like are prevented. The main relay 70 can be used at least with a rated current that is equal to or higher than the rated current set by the fuse 61. Such a main relay 70 can have the same components as another main relay that is provided in a current circuit for supplying the electric power from the battery 60 to another electrical component mounted on the vehicle. That is, a special component does not have to be used as the main relay 70 in the heater control device 80, and thus general versatility thereof is improved.

In the heater control device 80 according to this embodiment, the main relay 70 provided in the common current supply circuit 91 switches ON and OFF of the electric power supply to the tank heater 35 and the piping heater 47. For such a reason, the main relay 70 provided in the common current supply circuit 91 is requested to be able to handle a maximum current that flows therethrough in the case where both of the tank heater 35 and the piping heater 47 are driven. In other words, in the case where a general-purpose component mounted on the vehicle is used as the main relay 70, the tank heater 35 and the piping heater 47 have to be driven such that a total value of the currents used for the control of the tank heater 35 and the piping heater 47 does not exceed a maximum rated current of such a main relay 70.

3-2. Controller

FIG. 3 is a block diagram of a configuration example of the controller 100. The controller 100 is configured to include a microcomputer such as a CPU. Such a controller 100 includes a temperature acquisition unit 111, a relay control unit 113, a heater control unit 115, a relay drive circuit 121, a first heater drive circuit 123, a second heater drive circuit 125, and a timer 127. Of these, each of the temperature acquisition unit 111, the relay control unit 113, and the heater control unit 115 may be a function that is realized by execution of a program by the microcomputer.

The controller 100 includes unillustrated storage elements such as random access memory (RAM) and read only memory (ROM). Such a controller 100 receives an ON or OFF signal of an ignition switch 25, a sensor signal of an ambient temperature sensor 27, and the sensor signal of the tank temperature sensor 37.

The temperature acquisition unit 111 reads the sensor signals of the ambient temperature sensor 27 and the tank temperature sensor 37, and acquires information on an ambient temperature Te and a temperature Tt in the tank 31 on the basis of the sensor signals. After the ignition switch 25 turns ON, the temperature acquisition unit 111 reads the sensor signals of the ambient temperature sensor 27 and the tank temperature sensor 37 per specified cycles. The information on the acquired temperatures Te, Tt may be stored in the storage element. The information on the acquired temperatures Te, Tt is used for the drive control of the tank heater 35 or the piping heater 47 by the heater control unit 115.

The relay control unit 113 outputs an instruction on opening/closing operation of the main relay 70 to the relay drive circuit 121. When the ignition switch 25 is switched from OFF to ON, the relay control unit 113 outputs an instruction on closing operation of the main relay 70 to the relay drive circuit 121. The relay drive circuit 121, which receives the instruction on the closing operation, supplies the current to the electromagnetic coil 71 of the main relay 70. As a result, the magnetic force is generated in the electromagnetic coil 71, the switch 73 is attracted to the electromagnetic coil 71 side, and the common current supply circuit 91 is thereby closed. In addition, when the ignition switch 25 is switched from ON to OFF, the relay control unit 113 outputs an instruction on opening operation of the main relay 70 to the relay drive circuit 121. The relay drive circuit 121, which receives the instruction on the opening operation, stops energizing the electromagnetic coil 71 of the main relay 70. As a result, the magnetic force in the electromagnetic coil 71 is no longer generated, the switch 73 is opened, and the common current supply circuit 91 is thereby opened.

The heater control unit 115 executes the drive control of the tank heater 35 and the piping heater 47. The heater control unit 115 outputs a drive instruction to the first heater drive circuit 123 for driving the tank heater 35 and to the second heater drive circuit 125 for driving the piping heater 47. The first heater drive circuit 123 controls the electric power supply to the tank heater 35 on the basis of the drive instruction from the heater control unit 115. The second heater drive circuit 125 controls the electric power supply to the piping heater 47 on the basis of the drive instruction from the heater control unit 115.

In the heater control device 80 according to this embodiment, a defrosting mode and a heat-retention mode are set as control modes of the tank heater 35 and the piping heater 47 by the heater control unit 115. The defrosting mode is a mode in which the urea aqueous solution is preferentially defrosted without executing the injection control of the urea aqueous solution in the case where it is estimated that the urea aqueous solution is in a frozen state. The heat-retention mode is a mode in which the tank heater 35 and the piping heater 47 are driven with a smaller consumption current than the defrosting mode to retain heat thereof in the case where the urea aqueous solution in a defrosted state is possibly frozen.

When the ignition switch 25 is switched from OFF to ON and the controller 100 is activated, the heater control unit 115 refers to the temperature Tt in the tank 31 and the ambient temperature Te, which are acquired by the temperature acquisition unit 111. In the case where the temperature Tt in the tank 31 and the ambient temperature Te are equal to or lower than the freezing point of the urea aqueous solution, the heater control unit 115 selects the defrosting mode. Meanwhile, in the case where the ambient temperature Te is equal to or lower than the freezing point of the urea aqueous solution while the temperature Tt in the tank 31 exceeds the freezing point of the urea aqueous solution, the heater control unit 115 selects the heat-retention mode. Furthermore, in the case where both of the temperature Tt in the tank 31 and the ambient temperature Te exceed the freezing point of the urea aqueous solution, the heater control unit 115 brings the tank heater 35 and the piping heater 47 into undriven states.

Note that threshold values of the temperature Tt in the tank 31 and the ambient temperature Te used for mode selection are set to appropriate values. In addition, the threshold value of the temperature Tt in the tank 31 and the threshold value of the ambient temperature Te may be the same as or differ from each other.

The drive control of the tank heater 35 is executed as follows. In the case where the heater control unit 115 selects the defrosting mode when the ignition switch 25 is turned ON, the heater control unit 115 sets whether to drive the tank heater 35 and a drive period of the tank heater 35 on the basis of the temperature Tt in the tank 31. Meanwhile, in the case where the heat-retention mode is selected when the ignition switch 25 is ON, the heater control unit 115 sets whether to drive the tank heater 35 and the drive period of the tank heater 35 on the basis of the ambient temperature Te.

Similar to the above-described mode selection, it may be determined whether to drive the tank heater 35 in the defrosting mode in accordance with whether the temperature Tt in the tank 31 is equal to or lower than the freezing point of the urea aqueous solution. In addition, similar to the above-described mode selection, it may be determined whether to drive the piping heater 47 in the heat-retention mode in accordance with whether the ambient temperature Te is equal to or lower than the freezing point of the urea aqueous solution. The drive period of the tank heater 35 is calculated by referring to a map that is stored in the storage element in advance. In either the defrosting mode or the heat-retention mode, the drive period of the tank heater 35 is set to be a longer period as the temperature Tt in the tank 31 or the ambient temperature Te is reduced.

In the case where the tank heater 35 is driven, the heater control unit 115 outputs the drive instruction to the first heater drive circuit 123 so as to start supplying the voltage to the tank heater 35. In this way, the current starts being supplied to the tank heater 35, and the urea aqueous solution starts being defrosted. At this time, because the PTC element is in a low temperature state at the start of driving of the tank heater 35, the relatively large current flows through the tank heater 35. Thereafter, the tank heater 35 continues being supplied with the voltage. As defrosting of the urea aqueous solution progresses, the temperature Tt in the tank 31 is gradually increased, and a current value (hereinafter also referred to as a "tank heater current") I_tank flowing through the tank heater 35 is gradually reduced along with an increase in the temperature of the PTC element. Then, when the drive period, which is set at the start of driving of the tank heater 35, elapses, the heater control unit 115 stops supplying the voltage to the tank heater 35.

As described above, since the tank heater 35 has the function of automatically suppressing the excessive temperature increase, the heater control unit 115 only controls switching between ON and OFF of the tank heater 35. That is, in either mode of the defrosting mode or the heat-retention mode of the tank heater 35, switching between ON and OFF of the voltage supply to the tank heater 35 is only controlled, and a maximum value of the tank heater current I_tank differs in accordance with at least one of the temperature Tt in the tank 31, the ambient temperature Te, and the state of the battery 60 at this time.

FIG. 4 illustrates examples of a temporal change in the tank heater current I_tank that flows through the tank heater 35 having the PTC element. FIG. 4 illustrates the temporal changes in the tank heater current I_tank in the case where the tank heater 35 is disposed in the urea aqueous solution that is accommodated in the tank 31 and different values of the voltage (10.0 V, 13.5 V, 16.0 V) are supplied to the tank heater 35 in a state where the temperature of the urea aqueous solution is 30° C. below zero. That is, the temporal changes in the tank heater current I_tank at the time when the tank heater 35 starts being driven in the state where a temperature of the PTC element is 30° C. below zero are illustrated.

In the case where the voltages of 13.5 V and 16.0 V are supplied, the large current is supplied due to the low temperature of the PTC element immediately after the voltage starts being supplied. Thus, the urea aqueous solution is heated with the large amount of the heat. Accordingly, the urea aqueous solution is efficiently heated. In addition, due to a temperature increase in the PTC element, the resistance value of the PTC element is increased, and the tank heater current I_tank is thereafter gradually reduced. Compared to the case where the voltage of 13.5 V is supplied, in the case where the voltage of 16.0 V is supplied, the heat generation amount is large from a time point immediately after the PTC heater starts being driven, and a temperature increasing speed of the urea aqueous solution is high. Accordingly, compared to the case where the voltage of 13.5 V is supplied, in the case where the voltage of 16.0 V is supplied, a temperature increasing speed of the PTC element is relatively high, and the tank heater current I_tank becomes relatively small one minute after the start of the voltage supply.

Compared to the case where the voltages of 16.0 V and 13.5 V are supplied, in the case where the voltage of 10.0 V is supplied, the tank heater current I_tank is relatively small immediately after the start of the voltage supply, and the temperature increasing speed of the urea aqueous solution is relatively low. Accordingly, in the case where the voltage of 10.0 V is supplied, the temperature increasing speed of the PTC element is low, and a resistance value increasing speed of the PTC element is also low. Thus, a significant change in the tank heater current I_tank is not observed.

For example, when the new battery 60 starts being used, the tank heater current I_tank is changed along a characteristic line of a case where the supply voltage is set to 16.0 V. When the battery 60 is deteriorated over time, the tank heater current I_tank is changed along a characteristic line of a case where the supply voltage is set to 10.0 V, for example. Thus, as the battery 60 is newer, the maximum value of the tank heater current I_tank at the time of driving the tank heater 35 tends to be increased.

The drive control of the piping heater 47 is executed as follows. In either case of the case where the heater control unit 115 selects the defrosting mode or the case where the heater control unit 115 selects the heat-retention mode when the ignition switch 25 is turned ON, the heater control unit 115 sets whether to drive the piping heater 47 and a drive period of the piping heater 47 on the basis of a lower temperature of the temperature Tt in the tank 31 and the ambient temperature Te. By using the lower temperature of the temperature Tt in the tank 31 and the ambient temperature Te, it is possible to improve reliability in defrosting of the urea aqueous solution or to improve reliability in prevention of refreezing of the urea aqueous solution.

Similar to the above-described mode selection, it may be determined whether to drive the piping heater 47 in accordance with whether the threshold value of the temperature Tt in the tank 31 or the ambient temperature Te is equal to or lower than the freezing point of the urea aqueous solution. The drive period of the piping heater 47 is calculated by referring to a map that is stored in the storage element in advance. In either the defrosting mode or the heat-retention mode, the drive period of the piping heater 47 is set to be a longer period as the temperature Tt in the tank 31 or the ambient temperature Te is reduced.

In the case where the piping heater 47 is driven, the heater control unit 115 outputs the drive instruction to the second heater drive circuit 125 so as to start supplying the current to the piping heater 47. In this way, the current starts being supplied to the piping heater 47, and the urea aqueous solution in the flow channel for the urea aqueous solution starts being defrosted. As described above, the resistance value of the piping heater 47 is not significantly changed by the temperature. Thus, unlike the PTC heater, the piping heater 47 does not have the function of automatically suppressing the excessive temperature increase. For such a reason, the heater control unit 115 executes feedback control of a current value supplied to the piping heater 47 (hereinafter also referred to as a "piping heater current") I_path such that the piping heater current I_path becomes a specified control target current value I_path_tgt. Then, when the drive period, which is set at the start of driving of the piping heater 47, elapses, the heater control unit 115 stops supplying the current to the piping heater 47.

For example, the heater control unit 115 may read a sensor signal of a current sensor that is provided in the middle of a current path through which the electric power is supplied from the controller 100 to the piping heater 47, and may execute the feedback control of the piping heater current I_path to be supplied to the piping heater 47 on the basis of a difference between the detected piping heater current I_path and the control target current value I_path_tgt. The piping heater current I_path to be supplied to the piping heater 47 may be detected by the current sensor that uses a shunt resistor or the like, or may be estimated on the basis of the supplied voltage, the ambient temperature Te, and the like.

The control target current value I_path_tgt is set such that the urea aqueous solution is defrosted by the piping heater 47 and refreezing of the urea aqueous solution is prevented after defrosting. In this embodiment, the heater control unit 115 makes the control target current value I_path_tgt of the piping heater 47 differ between the defrosting mode and the heat-retention mode. The heat-retention mode is the mode in which freezing of the urea aqueous solution in the defrosted state is suppressed, and the control target current value I_path_tgt is set to be smaller than that in the defrosting mode. The control target current value I_path_tgt of the piping heater 47 is set to be smaller than the tank heater current I_tank that is supplied to the tank heater 35. At least in a certain period after the tank heater 35 starts being driven, the control target current value I_path_tgt of the piping heater 47 is set to be a smaller value than the tank heater current I_tank that is supplied to the tank heater 35.

Here, the piping heater current I_path that is supplied to the piping heater 47 is controlled to be substantially constant. Meanwhile, the tank heater current I_tank that is supplied to the tank heater 35 acquires a large value immediately after the tank heater 35 starts being driven, and is then gradually reduced. Thus, in the case where the piping heater 47 is driven at the time when the tank heater 35 starts being driven, a total value of the currents required for heater control possibly exceeds a maximum rated current I_max of the common current supply circuit 91 depending on the temperature Tt in the tank 31 or a deteriorated state of the battery 60.

FIG. 5 includes explanatory graphs illustrating an example of temporal changes in the current values at the time when the reducing agent supplier 30 is activated in a state where the temperature Tt in the tank 31 is 30° C. below zero and the tank heater 35 and the piping heater 47 simultaneously start being driven in the defrosting mode. FIG. 5 illustrates the example of a case where the maximum rated current I_max of the common current supply circuit 91 is 15.0 A, where the consumption current of the controller 100 is 0.5 A, where the control target current value I_path_tgt of the piping heater 47 in the defrosting mode is 4.4 A, and where the new battery 60 is used. In addition, FIG. 5 illustrates the example of a case where the ambient temperature Te is constant at 30° C. below zero.

Hereinafter, the current that is supplied to the tank heater 35 through the first current supply circuit 93 will be referred to as the "tank heater current I_tank", and the current that is supplied to the piping heater 47 through the second current supply circuit 95 will be referred to as the "piping heater current I_path". Note that, as described above, in the heater control device 80 according to this embodiment, the second current supply circuit 95 that supplies the electric power to the piping heater 47 is also used to supply the electric power to the power supply circuit of the controller 100. Thus, the "piping heater current I_path" also includes the consumption current of the controller 100 itself.

When the controller 100 is activated at time t1, the current of 0.5 A flows through the power supply circuit of the controller 100. Thus, the piping heater current I_path is 0.5 A. Because neither the tank heater 35 nor the piping heater 47 is driven at this time, the current of 0.5 A flows through the common current supply circuit 91.

When the tank heater 35 and the piping heater 47 simultaneously start being driven at time t2, the current is supplied to each of the tank heater 35 and the piping heater 47. The current of 4.4 A is supplied to the piping heater 47. Thus, with the current of 0.5 A flowing through the power supply circuit, the piping heater current I_path is 4.9 A. Meanwhile, when the tank heater 35 starts being driven, the current of 13.3 A is supplied to the tank heater 35, and the tank heater current I_tank is 13.3 A. Thus, the current of 18.2 A that is a total value of the piping heater current I_path and the tank heater current I_tank flows through the common current supply circuit 91. Such a current value exceeds the maximum rated current I_max (=15.0 A) of the common current supply circuit 91.

Thereafter, the urea aqueous solution in the tank 31 is defrosted by the tank heater 35. Along with the increase in the temperature Tt in the tank 31, the resistance value of the PTC element is increased, and the tank heater current I_tank is gradually reduced. However, in a period until the tank heater current I_tank is reduced to be lower than 10.1 A, a state where the total value of the piping heater current I_path and the tank heater current I_tank exceeds the maximum rated current I_max of the common current supply circuit 91 continues. Then, when the tank heater current I_tank is reduced to 10.0 A at time t3, the total value of the piping heater current I_path and the tank heater current I_tank thereafter falls below the maximum rated current I_max of the common current supply circuit 91.

Just as described, when the tank heater 35 and the piping heater 47 simultaneously start being driven, in a certain period after the tank heater 35 and the piping heater 47 start being driven, the total value of the piping heater current I_path and the tank heater current I_tank exceeds the maximum rated current I_max of the common current supply circuit 91. Thus, the special main relay 70 or the like that can handle the maximum current value has to be used.

Meanwhile, when the tank heater 35 starts being driven, the heater control unit 115 of the heater control device 80 according to this embodiment brings the piping heater 47 into the undriven state. In addition, the heater control unit 115 drives the tank heater 35 and the piping heater 47 such that the total value of the tank heater current I_tank and the piping heater current Ipath exceeds the maximum rated current I_max of the common current supply circuit 91. In this way, the current is no longer supplied to the piping heater 47 in a period immediately after the tank heater 35 starts being driven. Thus, it is possible to suppress the current flowing through the common current supply circuit 91 from exceeding the maximum rated current I_max. As a result, a general-purpose component can be used as a component of the main relay 70 or the like provided in the common current supply circuit 91, and thus cost increase can be suppressed.

FIG. 6 includes explanatory graphs illustrating an example of temporal changes in the current values at the time when drive start timing of the piping heater 47 is delayed from drive start timing of the tank heater 35. A specification of the heater control device 80 is the same as that in the example illustrated in FIG. 5.

At time t11, the controller 100 is activated, the current of 0.5 A flows through the power supply circuit of the controller 100, and the current of 0.5 A flows through the common current supply circuit 91. At time t12, the piping heater 47 is maintained in the undriven state. Meanwhile, when the tank heater 35 starts being driven, the current is supplied to the tank heater 35. When the tank heater 35 starts being driven, the current of 13.3 A is supplied to the tank heater 35, and the tank heater current I_tank is 13.3 A. Thus, the current of 13.8 A that is the total value of the piping heater current I_path and the tank heater current I_tank flows through the common current supply circuit 91. Such a current value falls below the maximum rated current I_max (=15.0 A) of the common current supply circuit 91.

Thereafter, the urea aqueous solution in the tank 31 is defrosted by the tank heater 35. Along with the increase in the temperature Tt in the tank 31, the resistance value of the PTC element is increased, and the tank heater current I_tank is gradually reduced. Then, when the tank heater current I_tank is reduced to 10.0 A at time t13, the piping heater 47 starts being driven, and the current is supplied to the piping heater 47. Since the control target current value I_path_tgt of the piping heater 47 is 4.4 A, the current of 14.9 A that is the total value of the piping heater current I_path and the tank heater current I_tank flows through the common current supply circuit 91. Such a current value never exceeds the maximum rated current I_max of the common current supply circuit 91, and the total value of the piping heater current I_path and the tank heater current I_tank thereafter is maintained to be smaller than the maximum rated current I_max of the common current supply circuit 91.

FIG. 7 includes explanatory graphs illustrating an example of a control method of the piping heater 47 and the tank heater 35 and temporal changes in the current values in the case where the piping heater 47 starts being driven prior to the tank heater 35. The example illustrated in FIG. 7 is an example of a case where a drive start condition of the piping heater 47 is established before a drive start condition of the tank heater 35 is established. The specification of the heater control device 80 is the same as that in the example illustrated in FIG. 5.

At time t21, the controller 100 is activated, the current of 0.5 A flows through the power supply circuit of the controller 100, and the current of 0.5 A flows through the common current supply circuit 91. At time t22, the tank heater 35 is maintained in the undriven state. Meanwhile, when the piping heater 47 starts being driven, the current of 4.4 A is supplied to the piping heater 47. Thus, with the current of 0.5 A flowing through the power supply circuit, the piping heater current I_path is 4.9 A.

Furthermore, when the drive start condition of the tank heater 35 is established at time t23, the piping heater 47 stops being driven once, and the tank heater 35 starts being driven. In this way, the current is supplied to the tank heater 35. When the tank heater 35 starts being driven, the current of 13.3 A is supplied to the tank heater 35, and the tank heater current I_tank is 13.3 A. Thus, the current of 13.8 A that is the total value of the piping heater current Ipath and the tank heater current I_tank flows through the common current supply circuit 91. Such a current value falls below the maximum rated current I_max (=15.0 A) of the common current supply circuit 91.

Thereafter, the urea aqueous solution in the tank 31 is defrosted by the tank heater 35. Along with the increase in the temperature Tt in the tank 31, the resistance value of the PTC element is increased, and the tank heater current I_tank is gradually reduced. Then, when the tank heater current I_tank is reduced to 10.0 A at time t24, the piping heater 47 is driven again, and the current of 4.4 A is supplied to the piping heater 47 again. At this time, a current of 14.9 A, which is the total value of the piping heater current I_path and the tank heater current I_tank, flows through the common current supply circuit 91. Such a current value never exceeds the maximum rated current I_max of the common current supply circuit 91, and the total value of the piping heater current I_path and the tank heater current I_tank thereafter is maintained to be smaller than the maximum rated current I_max of the common current supply circuit 91.

Just as described, the piping heater 47 is brought into the undriven state when the tank heater 35 starts being driven. In this way, the current is not supplied to the piping heater 47 while the tank heater current I_tank is large. Thus, it is possible to suppress the current that exceeds the maximum rated current I_max from flowing through the common current supply circuit 91.

After the tank heater 35 starts being driven, the heater control unit 115 may detect or estimate the tank heater current I_tank, for example, and may start driving the piping heater 47 when a sum of the tank heater current I_tank and the control target current value I_path_tgt of the piping heater 47 becomes smaller than the maximum rated current I_max of the common current supply circuit 91. The tank heater current I_tank may be detected by the current sensor that uses the shunt resistor or the like, for example. Alternatively, the tank heater current I_tank may be estimated on the basis of at least one type of information among a current characteristic of the tank heater 35, the value of the battery voltage, the ambient temperature Te, the temperature Tt in the tank 31, and the like. In this case, in consideration of detection accuracy or estimation accuracy of the tank heater current I_tank, the value thereof that is smaller than the maximum rated current I_max of the common current supply circuit 91 may be set as the threshold value.

In addition, the heater control unit 115 may determine the drive start timing of the piping heater 47 after the start of driving of the tank heater 35 on the basis of the temperature Tt in the tank 31 or the ambient temperature Te. It is because, as the temperature Tt in the tank 31 or the ambient temperature Te is reduced, a time required for the sum of the tank heater current I_tank and the control target current value I_path_tgt of the piping heater 47 to become smaller than the maximum rated current I_max of the common current supply circuit 91 extends. Furthermore, the heater control unit 115 may determine the drive start timing of the piping heater 47 after the start of driving of the tank heater 35 on the basis of the voltage of the battery 60. It is because, as the voltage of the battery 60 is reduced, the time required for the sum of the tank heater current I_tank and the control target current value I_path_tgt of the piping heater 47 to become smaller than the maximum rated current I_max of the common current supply circuit 91 extends.

FIG. 8 is an explanatory diagram illustrating an example of a method for determining a set delay time t_delay_set until the piping heater 47 starts being driven since the start of driving of the tank heater 35. In the example illustrated in FIG. 8, the heater control unit 115 acquires a battery voltage Vb and the temperature Tt in the tank 31 to calculate a first delay time t_delay_1 by referring to a first map map1. In addition, the heater control unit 115 acquires the battery voltage Vb and the ambient temperature Te to calculate a second delay time t_delay_2 by referring to a second map map2. Then, the heater control unit 115 selects a larger value of the first delay time t_delay_1 and the second delay time t_delay_2, which have been calculated, as the set delay time t_delay_set. By setting the larger value as the set delay time t_delay_set, it is possible to improve reliability that the current exceeding the maximum rated current I_max does not flow through the common current supply circuit 91.

Each of the first map map1 and the second map map2 is created in advance on the basis of a relationship among the temperature Tt in the tank 31 or the ambient temperature Te, the battery voltage Vb, and the change in the current value after the start of the energization of the tank heater 35 as exemplified in FIG. 4, and is stored in the storage element. It is assumed that the temperature of the PTC element in the tank heater 35 approximates the temperature Tt in the tank 31 or the ambient temperature Te. Thus, in each of the first map map1 and the second map map2, a time until the sum of the tank heater current I_tank and the control target current value I_path_tgt of the piping heater 47 falls below the maximum rated current I_max of the common current supply circuit 91 after the start of the energization of the tank heater 35 is set for each of the plural battery voltage Vb. When the first map map1 and the second map map2 are created, a remaining amount of the urea aqueous solution in the tank 31 may further be taken into consideration. It is because, as the remaining amount of the urea aqueous solution is reduced, the increasing speed of the temperature Tt in the tank 31 tends to become higher, and the temperature increasing speed of the PTC element also tends to become higher.

Just as described, instead of detecting or estimating the tank heater current I_tank, the heater control unit 115 may set the set delay time t_delay_set until the start of driving of the piping heater 47, so as to determine the drive start timing of the piping heater 47.

4. Heater Control Method

Next, a description will be made on specific examples of a flowchart of a heater control method that is executed by the heater control device 80 according to this embodiment.

4-1. First Example

First, a description will be made on an example of the flowchart in the case where the current supplied to the tank heater 35 is detected or estimated with reference to FIG. 9 and FIG. 10. The flowchart of such a heater control method may be set to be executed all times.

After the controller 100 is activated, the heater control unit 115 of the controller 100 determines whether the ignition switch 25 is ON (step S11). While the ignition switch 25 is OFF (S11: No), such a determination is repeatedly made. If the ignition switch 25 is ON (S11: Yes), the heater control unit 115 determines whether driving of the heaters is required (step S13). For example, the heater control unit 115 refers to the temperature Tt in the tank 31 and the ambient temperature Te, so as to determine whether the tank heater 35 and the piping heater 47 have to be driven in the defrosting mode or the heat-retention mode.

More specifically, in the case where the temperature Tt in the tank 31 and the ambient temperature Te are equal to or lower than the freezing point of the urea aqueous solution, the heater control unit 115 determines that the tank heater 35 and the piping heater 47 have to be driven in the defrosting mode. In addition, in the case where the ambient temperature Te is equal to or lower than the freezing point of the urea aqueous solution while the temperature Tt in the tank 31 exceeds the freezing point of the urea aqueous solution, the heater control unit 115 determines that the tank heater 35 and the piping heater 47 have to be driven in the heat-retention mode. Meanwhile, in the case where both of the temperature Tt in the tank 31 and the ambient temperature Te significantly exceed the freezing point of the urea aqueous solution, the heater control unit 115 determines that neither the tank heater 35 nor the piping heater 47 has to be driven.

If the heater control unit 115 determines that driving of the heaters is not required (S13: No), the processing returns to step S11, and the heater control unit 115 determines again whether the ignition switch 25 is ON. On the other hand, if the heater control unit 115 determines that driving of the heaters is required (S13: Yes), the defrosting mode or the heat-retention mode is activated, and the tank heater 35 and the piping heater 47 are brought into standby states (step S15).

Next, the heater control unit 115 determines whether the drive start condition of the tank heater 35 for the first heater drive circuit 123 is established prior to the drive start condition of the piping heater 47 for the second heater drive circuit 125 (step S17). Whether to drive the tank heater 35 in the defrosting mode is determined on the basis of whether the temperature Tt in the tank 31 is equal to or lower than the freezing point of the urea aqueous solution. In addition, whether to drive the piping heater 47 in the heat-retention mode is determined on the basis of whether the ambient temperature Te is equal to or lower than the freezing point of the urea aqueous solution. Furthermore, whether to drive the piping heater 47 in the defrosting mode or the heat-retention mode is determined on the basis of whether the temperature Tt in the tank 31 or the ambient temperature Te is equal to or lower than the freezing point of the urea aqueous solution.

If the drive start condition of the tank heater 35 is established prior to the drive start condition of the piping heater 47 (S17: Yes), the heater control unit 115 starts driving the tank heater 35 by supplying the voltage thereto (step S25).

On the other hand, if the drive start condition of the piping heater 47 is established prior to the drive start condition of the tank heater 35 (S17: No), the heater control unit 115 starts driving the piping heater 47 by supplying the current thereto (step S19). At this time, the heater control unit 115 may set drive duration of the piping heater 47 before starting driving the piping heater 47. For example, the heater control unit 115 sets a drive period that is required to defrost or keep the temperature of the urea aqueous solution on the basis of the lower temperature of the temperature Tt in the tank 31 and the ambient temperature Te.

After the piping heater 47 starts being driven, the heater control unit 115 executes the feedback control of the supply current to the piping heater 47 such that the current supplied to the piping heater 47 becomes the control target current value I_path_tgt. As a result, the piping heater current Ipath, which is a sum of the consumption current of the controller 100 and the supply current to the piping heater 47, remains at a substantially constant value.

Next, the heater control unit 115 determines whether the drive start condition of the tank heater 35 is established (step S21). If the drive start condition of the tank heater 35 is not established (S21: No), the heater control unit 115 repeatedly making such a determination. On the other hand, if the drive start condition of the tank heater 35 is established (S21: Yes), the heater control unit 115 once stops driving the piping heater 47 (step S23) and starts driving the tank heater 35 (step S25).

In the case where the tank heater 35 starts being driven in step S25, the heater control unit 115 may set drive duration of the tank heater 35 before starting driving the tank heater 35. For example, in the defrosting mode, the heater control unit 115 sets the drive period that is required to defrost the urea aqueous solution on the basis of the temperature Tt in the tank 31. Meanwhile, in the heat-retention mode, the heater control unit 115 sets the drive period that is required to keep the temperature of the urea aqueous solution on the basis of the ambient temperature Te.

In the case where the tank heater 35 starts being driven, the tank heater current I_tank acquires the large value immediately after the tank heater 35 starts being driven in the defrosting mode. However, since the piping heater 47 is in the undriven state at the start of driving of the tank heater 35, the total value of the piping heater current I_path and the tank heater current I_tank does not exceed the maximum rated current I_max of the common current supply circuit 91. Thereafter, as the tank heater 35 keeps being driven, the temperature of the PTC element is increased, and the tank heater current I_tank is gradually reduced.

Next, the heater control unit 115 detects or estimates the tank heater current I_tank (step S27). For example, the heater control unit 115 may detects the current value that is supplied to the tank heater 35 by using the current sensor, or may estimate the current value that is supplied to the tank heater 35 on the basis of the battery voltage Vb, the ambient temperature Te, or the like. Next, the heater control unit 115 determines whether a sum of the detected or estimated tank heater current I_tank and the control target current value I_path_tgt of the piping heater 47 is equal to or smaller than the maximum rated current I_max of the common current supply circuit 91 (step S29).

If the sum of the tank heater current I_tank and the control target current value I_path_tgt of the piping heater 47 is equal to or larger than the maximum rated current I_max of the common current supply circuit 91 (S29: No), the processing returns to step S27, and the heater control unit 115 detects or estimates the tank heater current I_tank again. The heater control unit 115 repeatedly executes the processing in step S27 and step S29 until the sum of the tank heater current I_tank and the control target current value I_path_tgt of the piping heater 47 becomes smaller than the maximum rated current I_max.

Then, if the sum of the tank heater current I_tank and the control target current value I_path_tgt of the piping heater 47 becomes smaller than the maximum rated current I_max (S29: Yes), the heater control unit 115 starts driving the piping heater 47 (step S31). At this time, similar to the case of step S19 described above, the heater control unit 115 may set the drive duration of the piping heater 47 before starting driving the piping heater 47. Alternatively, in the case where the piping heater 47, which starts driving in step S19, is stopped once in step S23 and is driven again, the setting of the drive duration, which is set in step S19, may be maintained. In this case, the piping heater 47 is driven until a total value of the periods in which the piping heater 47 is driven after step S19 reaches the set drive duration.

Thereafter, the piping heater current I_path remains at the substantially constant value, and the tank heater current I_tank is gradually reduced. During this time, the total value of the piping heater current I_path and the tank heater current I_tank never exceeds the maximum rated current I_max of the common current supply circuit 91.

Next, the heater control unit 115 determines whether defrosting or heat retention of the urea aqueous solution is completed (step S33). In the example of the heater control method according to this embodiment, the heater control unit 115 determines whether the set drive duration of the tank heater 35 and the set drive duration of the piping heater 47 have elapsed. If neither the drive duration of the tank heater 35 nor the drive duration of the piping heater 47 has not elapsed (S33: No), the heater control unit 115 repeatedly making the determination in step S33. On the other hand, if the drive duration of the tank heater 35 and the drive duration of the piping heater 47 have elapsed (S33: Yes), the heater control unit 115 terminates the drive control of the tank heater 35 and the piping heater 47.

As it has been described so far, in the first example of the heater control method, the piping heater 47 is brought into the undriven state when the tank heater 35 starts being driven. In this way, in the period in which the large current is supplied to the tank heater 35, the current supply to the piping heater 47 is stopped. Accordingly, it is possible to prevent the total value of the tank heater current I_tank and the piping heater current I_path from exceeding the maximum rated current I_max of the common current supply circuit 91.

In the first example of the heater control method, the tank heater current I_tank is detected or estimated. Then, when the sum of the tank heater current I_tank and the control target current value I_path_tgt of the piping heater 47 falls below the maximum rated current I_max of the common current supply circuit 91, the piping heater 47 starts being driven. Accordingly, it is possible to improve the reliability that the total value of the tank heater current I_tank and the piping heater current I_path does not exceed the maximum rated current I_max of the common current supply circuit 91.

4-2. Second Example

Next, a description will be made on an example of the flowchart in the case where the set delay time from the start of driving of the tank heater 35 to the start of driving of the piping heater 47 is set with reference to FIG. 9 and FIG. 11. The flowchart of such a heater control method may be set to be executed all times. In the second example of the heater control method, the processing in step S11 to step S23 illustrated in FIG. 9 is executed in a similar manner to the processing in each of the steps in the first example. Accordingly, the description will hereinafter be made on the flowchart illustrated in FIG. 11. In FIG. 11, the steps in which the same processing as that in the flowchart illustrated in FIG. 10 will be denoted by the same reference signs.

Similar to step S25 in FIG. 10, after the heater control unit 115 of the controller 100 starts driving the tank heater 35, the heater control unit 115 reads the battery voltage Vb, the temperature Tt in the tank 31, and the ambient temperature Te (step S37). Next, the heater control unit 115 calculates the first delay time t_delay_1 on the basis of the battery voltage Vb and the temperature Tt in the tank 31 (step S39). For example, the heater control unit 115 may calculate the first delay time t_delay_1 by referring to the first map map1, which is created in advance on the basis of the relationship among the temperature Tt in the tank 31, the battery voltage Vb, and the change in the current value after the start of the energization of the tank heater 35, and which is stored in the storage element.

Next, the heater control unit 115 calculates the second delay time t_delay_2 on the basis of the battery voltage Vb and the ambient temperature Te (step S41). For example, the heater control unit 115 may calculate the second delay time t_delay_2 by referring to the second map map2, which is created in advance on the basis of the relationship among the ambient temperature Te, the battery voltage Vb, and the change in the current value after the start of the energization of the tank heater 35, and which is stored in the storage element.

After calculating the first delay time t_delay_1 and the second delay time t_delay_2, the heater control unit 115 sets the larger value of the first delay time t_delay_1 and the second delay time t_delay_2 as the set delay time t_delay_set (step S43). Next, the heater control unit 115 determines whether an elapsed time since the start of driving of the tank heater 35 reaches the set delay time t_delay_set (step S45). If the elapsed time does not reach the set delay time t_delay_set (S45: No), the heater control unit 115 repeatedly making the determination in step S45.

On the other hand, if the elapsed time since the start of driving of the tank heater 35 reaches the set delay time t_delay_set (S45: Yes), similar to step S31 in the flowchart illustrated in FIG. 10, the heater control unit 115 starts driving the piping heater 47. Furthermore, similar to step S33 in the flowchart illustrated in FIG. 10, the heater control unit 115 determines whether defrosting or the heat retention of the urea aqueous solution is completed. If the drive duration of the tank heater 35 and the drive duration of the piping heater 47 have elapsed (S33: Yes), the heater control unit 115 terminates the drive control of the tank heater 35 and the piping heater 47.

As it has been described so far, in the second example of the heater control method, the piping heater 47 is driven when the time (the set delay time t_delay_set) in which the total value of the tank heater current I_tank and the piping heater current I_path is estimated to fall below the maximum rated current I_max of the common current supply circuit 91 elapses. Accordingly, even in the case where the tank heater current I_tank is neither detected nor estimated, it is possible to improve the reliability that the total value of the tank heater current I_tank and the piping heater current I_path does not exceed the maximum rated current I_max of the common current supply circuit 91.

As it has been described so far, the heater control device 80 and the heater control method according to this embodiment bring the piping heater 47 into the undriven state when the tank heater 35 starts being driven. Accordingly, immediately after the tank heater 35 starts being driven, the current supply to the piping heater 47 is stopped in the period in which the tank heater current I_tank acquires the large value, and it is thus controlled that the total value of the tank heater current I_tank and the piping heater current I_path does not exceed the maximum rated current I_max of the common current supply circuit 91.

In addition, after the tank heater 35 starts being driven, the heater control device 80 and the heater control method according to this embodiment drives the piping heater 47 at such timing that it is possible to determine that the sum of the tank heater current I_tank and the control target current value I_path_tgt of the piping heater 47 falls below the maximum rated current I_max of the common current supply circuit 91. Accordingly, it is possible to improve the reliability that the sum of the tank heater current I_tank and the control target current value I_path_tgt of the piping heater 47 does not exceed the maximum rated current I_max of the common current supply circuit 91.

As described above, in the heater control device 80 and the heater control method according to this embodiment, the current flowing through the common current supply circuit 91 is suppressed from exceeding the maximum rated current I_max. Thus, the general-purpose component can be used as the component of the main relay 70 or the like provided in the common current supply circuit 91. Therefore, the special component does not have to be prepared, and thus the cost increase can be suppressed.

The preferred embodiment of the present invention has been described in detail so far with reference to the accompanying drawings. However, the present invention is not limited to such an embodiment. It is obvious that a person who has basic knowledge in the technical field to which the present invention pertains could have easily arrived at various modification examples and application examples that fall within the scope of the technical idea described in the claims. It is understood that those naturally fall within the technical scope of the present invention.

REFERENCE SIGNS LIST

- 10: Urea SCR system
- 25: Ignition switch
- 27: Ambient temperature sensor
- 30: Reducing agent supplier
- 31: Tank
- 33: Supply channel
- 35: Tank heater
- 37: Tank temperature sensor
- 40: Pump unit
- 41: Supply pump
- 43: Collection pump
- 47: Piping heater
- 60: Battery
- 61: Fuse
- 70: Main relay
- 80: Heater control device
- 91: Common current supply circuit
- 93: First current supply circuit
- 95: Second current supply circuit
- 100: Controller
- 111: Temperature acquisition unit
- 113: Relay control unit
- 115: Heater control unit
- 121: Relay drive circuit
- 123: First heater drive circuit
- 125: Second heater drive circuit

What is claimed is:

1. A heater control device (80) including: a tank heater (35) for heating a reducing agent stored in a tank (31); and a piping heater (47) for heating the reducing agent in a flow channel including a supply channel (33), the heater control device comprising:
    a first current supply circuit (93) that supplies a current to the tank heater (35);
    a second current supply circuit (95) that supplies a current to the piping heater (47);
    a common current supply circuit (91) that connects between a battery (60) and each of the first current supply circuit (93) and the second current supply circuit (95); and
    a heater control unit (115) that controls driving of the tank heater (35) and the piping heater (47),
    wherein the heater control unit (115) controls driving of the tank heater (35) and the piping heater (47) on a basis of a total value of the current supplied to the tank heater (35) and the current supplied to the piping heater (47) and a rated current value of the common current supply circuit (91), and
    the heater control unit (115) starts driving the piping heater (47) at a time when a sum of the supply current value to the tank heater (35) and a control target current value of the piping heater (47) becomes smaller than the rated current value of the common current supply circuit (91) after the tank heater (35) starts being driven.

2. The heater control device according to claim 1, wherein the heater control unit (115) drives the tank heater (35) and the piping heater (47) such that a total of a supply current value to the tank heater (35) and a supply current value to the piping heater (47) does not exceed the rated current value of the common current supply circuit (91).

3. The heater control device according to claim 1, wherein the heater control unit (115) determines timing, at which the piping heater (47) starts being driven after the tank heater (35) starts being driven, on a basis of a temperature in the tank (31) or an ambient temperature.

4. The heater control device according to claim 3, wherein the heater control unit (115) further determines the timing, at which the piping heater 47 starts being driven after the tank heater (35) starts being driven, on a basis of a voltage of the battery (60).

5. The heater control device according to claim 1, wherein the heater control unit (115) stops driving the piping heater (47) once in a case where the tank heater (35) starts being driven during driving of the piping heater (47).

6. The heater control device according to claim 1, wherein the heater control unit (115) determines whether to drive the tank heater (35) on a basis of a temperature in the tank (31).

7. The heater control device according to claim 1, wherein the heater control unit (115) determines whether to drive the piping heater (47) on a basis of an ambient temperature.

8. The heater control device according to claim 1 further comprising:
    a relay (70) that opens/closes the common current supply circuit (91).

9. A heater control method for controlling a tank heater (35) and a piping heater (47), the tank heater (35) being a heater for heating a reducing agent stored in a tank (31) and to which a current is supplied through a common current supply circuit (91) and a first current supply circuit (93), and the piping heater (47) being a heater for heating the reducing agent in a flow channel including a supply channel (33) and to which a current is supplied through the common current supply circuit (91) and a second current supply circuit (95), the heater control method comprising:

controlling driving of the tank heater (35) and the piping heater (47) on a basis of a total value of the current supplied to the tank heater (35) and the current supplied to the piping heater (47) and a rated current value of the common current supply circuit (91), and starting the piping heater (47) at a time when a sum of the supply current value to the tank heater (35) and a control target current value of the piping heater (47) becomes smaller than the rated current value of the common current supply circuit (91) after the tank heater (35) starts being driven.

10. The method according to claim 9, further comprising driving the tank heater (35) and the piping heater (47) such that a total of a supply current value to the tank heater (35) and a supply current value to the piping heater (47) does not exceed the rated current value of the common current supply circuit (91).

11. The method according to claim 9, further comprising determining timing, at which the piping heater (47) starts being driven after the tank heater (35) starts being driven, on a basis of a temperature in the tank (31) or an ambient temperature.

12. The method according to claim 11, further comprising determining the timing, at which the piping heater 47 starts being driven after the tank heater (35) starts being driven, on a basis of a voltage of the battery (60).

13. The method according to claim 9, further comprising stopping driving the piping heater (47) once in a case where the tank heater (35) starts being driven during driving of the piping heater (47).

14. The method according to claim 9, further comprising determining whether to drive the tank heater (35) on a basis of a temperature in the tank (31).

15. The method according to claim 9, further comprising determining whether to drive the piping heater (47) on a basis of an ambient temperature.

16. A heater control device (80) including: a tank heater (35) for heating a reducing agent stored in a tank (31); and a piping heater (47) for heating the reducing agent in a flow channel including a supply channel (33), the heater control device comprising:

a first current supply circuit (93) that supplies a current to the tank heater (35);

a second current supply circuit (95) that supplies a current to the piping heater (47);

a common current supply circuit (91) that connects between a battery (60) and each of the first current supply circuit (93) and the second current supply circuit (95); and a heater control unit (115) that controls driving of the tank heater (35) and the piping heater (47), wherein the heater control unit (115) controls driving of the tank heater (35) and the piping heater (47) on a basis of a total value of the current supplied to the tank heater (35) and the current supplied to the piping heater (47) and a rated current value of the common current supply circuit (91), wherein the tank heater (35) has a temperature characteristic in which a resistance value of the tank heater (35) increases as a temperature of the tank heater (35) rises, and wherein the piping heater (47) has temperature characteristic in which a change in resistance value due to a change in a temperature of the piping heater (47) is smaller than a change in resistance value of the tank heater (35) due to a change in a temperature of the tank heater (35) that is equivalent to the change in the temperature of the piping heater (47).

17. The heater control device according to claim 16, wherein the heater control unit (115) drives the tank heater (35) and the piping heater (47) such that a total of a supply current value to the tank heater (35) and a supply current value to the piping heater (47) does not exceed the rated current value of the common current supply circuit (91).

18. The heater control device according to claim 16, wherein the heater control unit (115) determines timing, at which the piping heater (47) starts being driven after the tank heater (35) starts being driven, on a basis of a temperature in the tank (31) or an ambient temperature.

19. The heater control device according to claim 18, wherein the heater control unit (115) further determines the timing, at which the piping heater 47 starts being driven after the tank heater (35) starts being driven, on a basis of a voltage of the battery (60).

20. The heater control device according to claim 16, wherein the heater control unit (115) stops driving the piping heater (47) once in a case where the tank heater (35) starts being driven during driving of the piping heater (47).

21. The heater control device according to claim 16, wherein the heater control unit (115) determines whether to drive the tank heater (35) on a basis of a temperature in the tank (31).

22. The heater control device according to claim 16, wherein the heater control unit (115) determines whether to drive the piping heater (47) on a basis of an ambient temperature.

23. The heater control device according to claim 16 further comprising:

a relay (70) that opens/closes the common current supply circuit (91).

24. A heater control method for controlling a tank heater (35) and a piping heater (47), the tank heater (35) being a heater for heating a reducing agent stored in a tank (31) and to which a current is supplied through a common current supply circuit (91) and a first current supply circuit (93), and the piping heater (47) being a heater for heating the reducing agent in a flow channel including a supply channel (33) and to which a current is supplied through the common current supply circuit (91) and a second current supply circuit (95), wherein the tank heater (35) has a temperature characteristic in which a resistance value of the tank heater (35) increases as a temperature of the tank heater (35) rises, and wherein the piping heater (47) has temperature characteristic in which a change in resistance value due to a change in a temperature of the piping heater (47) is smaller than a change in resistance value of the tank heater (35) due to a change in a temperature of the tank heater (35) that is equivalent to the change in the temperature of the piping heater (47), the heater control method comprising:

controlling driving of the tank heater (35) and the piping heater (47) on a basis of a total value of the current supplied to the tank heater (35) and the current supplied to the piping heater (47) and a rated current value of the common current supply circuit (91).

25. The method according to claim 24, further comprising driving the tank heater (35) and the piping heater (47) such that a total of a supply current value to the tank heater (35) and a supply current value to the piping heater (47) does not exceed the rated current value of the common current supply circuit (91).

26. The method according to claim 24, further comprising determining timing, at which the piping heater (47) starts being driven after the tank heater (35) starts being driven, on a basis of a temperature in the tank (31) or an ambient temperature.

27. The method according to claim 26, further comprising determining the timing, at which the piping heater 47 starts being driven after the tank heater (35) starts being driven, on a basis of a voltage of the battery (60).

28. The method according to claim 24, further comprising stopping driving the piping heater (47) once in a case where the tank heater (35) starts being driven during driving of the piping heater (47).

29. The method according to claim 24, further comprising determining whether to drive the tank heater (35) on a basis of a temperature in the tank (31).

30. The method according to claim 24, further comprising determining whether to drive the piping heater (47) on a basis of an ambient temperature.

\* \* \* \* \*